US012415898B2

(12) United States Patent
Sasaki et al.

(10) Patent No.: US 12,415,898 B2
(45) Date of Patent: Sep. 16, 2025

(54) POROUS BODY

(71) Applicant: NICHIAS CORPORATION, Tokyo (JP)

(72) Inventors: Hikari Sasaki, Tokyo (JP); Kei Tsukada, Tokyo (JP); Kazutaka Murayama, Tokyo (JP); Keiji Tsukahara, Tokyo (JP); Kazuki Soeda, Tokyo (JP); Hironari Fujiki, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 979 days.

(21) Appl. No.: 17/610,854

(22) PCT Filed: Jul. 14, 2020

(86) PCT No.: PCT/JP2020/027314
§ 371 (c)(1),
(2) Date: Nov. 12, 2021

(87) PCT Pub. No.: WO2020/230907
PCT Pub. Date: Nov. 19, 2020

(65) Prior Publication Data
US 2022/0259395 A1    Aug. 18, 2022

(30) Foreign Application Priority Data
May 14, 2019   (JP) ................. 2019-091499

(51) Int. Cl.
*C09K 3/10*      (2006.01)
*C08J 9/00*      (2006.01)
(52) U.S. Cl.
CPC ......... *C08J 9/0085* (2013.01); *C08J 2205/06* (2013.01); *C08J 2383/04* (2013.01)
(58) Field of Classification Search
CPC .. C08J 9/0085; C08J 2205/06; C08J 2383/04; C03C 25/285; C03C 25/40; C04B 2111/28; C04B 2111/52; C04B 26/06; C04B 26/32; C04B 30/02; C04B 38/10; C04B 2111/285; C04B 2111/343; C04B 2111/40; C04B 2111/503; C04B 2201/20; D04H 1/64; D04H 1/641; D04H 1/68; G10K 11/162; G10K 11/165; F16L 59/026; F16L 59/028; C09K 3/10; C09K 3/10; C09K 3/1028; C09K 2003/053; C09K 2200/0239; C09K 2200/0278
USPC ........................................................ 524/494
See application file for complete search history.

(56) References Cited

U.S. PATENT DOCUMENTS

| 4,668,315 A | 5/1987 | Brady et al. |
|---|---|---|
| 10,947,163 B2* | 3/2021 | Murayama .............. C03C 13/00 |
| 11,535,004 B2* | 12/2022 | Murayama .......... C04B 38/0054 |
| 2013/0017391 A1 | 1/2013 | Kato et al. |
| 2016/0305071 A1 | 10/2016 | Merry et al. |
| 2018/0016195 A1 | 1/2018 | Murayama et al. |
| 2019/0329524 A1 | 10/2019 | Murayama et al. |

FOREIGN PATENT DOCUMENTS

| CN | 109219845 A | 1/2019 |
|---|---|---|
| EP | 0 750 973 A2 | 1/1997 |
| GB | 1131044 A | 10/1968 |
| JP | S57-71466 A | 5/1982 |
| JP | S63-242978 A | 10/1988 |
| JP | H01-172280 A | 7/1989 |
| JP | H08-174687 A | 7/1996 |
| JP | 2005-029603 A | 2/2005 |
| JP | 2008-162852 A | 7/2008 |
| JP | 2016-186088 A | 10/2016 |
| JP | 2018-095860 A | 6/2018 |
| JP | 2018-119244 A | 8/2018 |
| WO | 2013/080294 A1 | 6/2013 |
| WO | 2016/121400 A1 | 8/2016 |
| WO | 2019/004153 A1 | 1/2019 |

OTHER PUBLICATIONS

Jun. 20, 2022 Office Action issued in Chinese Patent Application No. 202080035218.4.
Jan. 3, 2023 Extended European Search Report Issued in European Patent Application No. 20806575.5.
Nov. 16, 2021 International Preliminary Report on Patentability issued in International Patent Application No. PCT/JP2020/027314.
Sep. 24, 2020 International Search Report issued in International Patent Application No. PCT/JP2020/027314.
May 23, 2024 Office Action issued in European Patent Application No. 20806575.5.
Morgan Advanced Materials; "Cerafiber, Cerachem Bulks Product Data Sheet"; May 24, 2022; pp. 1-2; www.morganthermalceramics.com.

* cited by examiner

*Primary Examiner* — Hannah J Pak
(74) *Attorney, Agent, or Firm* — Oliff PLC

(57) ABSTRACT

A porous body including an inorganic fiber and an organic binder, wherein the average fiber diameter of the inorganic fiber is 2.0 µm or less, the amount of the inorganic fiber is 90% by mass or more, the amount of the organic binder is 0.5% by mass or more and 10% by mass or less, the organic binder contains an elastomer, and the bulk density of the porous body is 30 kg/m³ or less.

10 Claims, 1 Drawing Sheet

POROUS BODY

TECHNICAL FIELD

The invention relates to an inorganic fiber porous body, and a sound-insulating material, a heat-insulating material, a sound-absorbing material, and a sealing material containing the porous body.

BACKGROUND ART

The inorganic fiber porous body (foamed body) has elasticity similar to that of foamed polyurethane or foamed polyethylene, and is light, has excellent heat-insulating and sound-absorbing properties, and is nonflammable, and hence it can be used as a heat-insulating material for high-temperature portions of aircraft, rockets, ships, various other industrial equipment, etc.

As an inorganic fiber used for producing this type of porous body, asbestos fiber is most suitable, while in recent years, a porous body using an inorganic fiber other than asbestos fiber has been developed because the use of asbestos fiber has become difficult for reasons of environmental hygiene.

For example, Patent Document 1 discloses that an inorganic fiber having a charged surface is foamed using a surfactant having a hydrophilic group of an opposite sign to obtain a foamed body.

RELATED ART DOCUMENTS

Patent Documents

[Patent Document 1] WO 2016/121400 A1

SUMMARY OF THE INVENTION

The features of the inorganic fiber porous body include lightweight properties and flexibility, and on the other hand, the inorganic fiber porous body is easily damaged, so that care must be taken in handling it. Therefore, it is required to improve the strength of the inorganic fiber porous body and suppress breakage at the time of construction. It is an object of the invention to provide a porous body having excellent strength.

According to the invention, the following porous body, etc. are provided.
1. A porous body comprising an inorganic fiber and an organic binder, wherein the amount of the inorganic fiber is 90% by mass or more.
2. The porous body according to 1, wherein the amount of the organic binder is 0.5% by mass or more and 10% by mass or less.
3. The porous body according to 1 or 2, wherein the organic binder comprises an elastomer.
4. The porous body according to any one of 1 to 3, wherein the organic binder is one or more selected from the group consisting of a silicone elastomer and an acrylic elastomer.
5. The porous body according to any one of 1 to 4, wherein the organic binder comprises a silicone elastomer.
6. The porous body according to any one of 1 to 5, comprising a surfactant
7. The porous body according to any one of 1 to 6, wherein the bulk density is 30 kg/m$^3$ or less.
8. The porous body according to any one of 1 to 7, wherein the fracture stress is 2.5 kPa or more.
9. The porous body according to any one of 1 to 8, wherein the number per unit area of the bonding point by the organic binder is 8 or more.
10. A sound-insulating material comprising the porous body according to any one of 1 to 9.
11. A heat-insulating material comprising the porous body according to any one of 1 to 9.
12. A sound-absorbing material comprising the porous body according to any one of 1 to 9.
13. A sealing material comprising the porous body according to any one of 1 to 9.

According to one embodiment, the following porous body is preferable.

A porous body containing an inorganic fiber and an organic binder, wherein
the average fiber diameter of the inorganic fiber is 2.0 µm or less,
the amount of the inorganic fiber is 90% by mass or more,
the amount of the organic binder is 0.5% by mass or more and 10% by mass or less,
the organic binder contains an elastomer, and
the bulk density of the porous body is 30 kg/m$^3$ or less.

According to the invention, a porous body having excellent strength can be provided.

MODE FOR CARRYING OUT THE INVENTION

Figure 1:
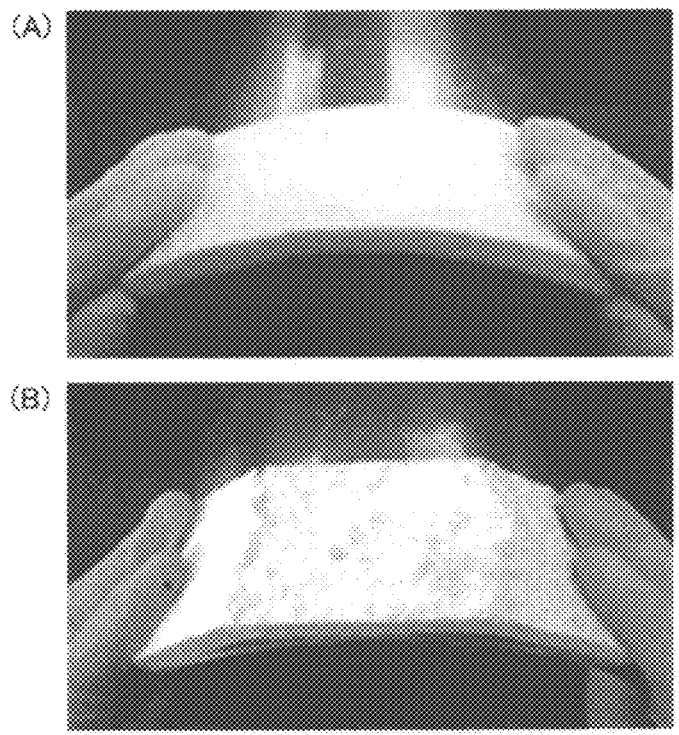
FIG. 1 is a photograph of the winding test.

A porous body according to one embodiment of the invention will be described. The characteristics described below are characteristics at normal temperature (23° C.) unless otherwise indicated.

The porous body according to one embodiment is a porous body containing an inorganic fiber and an organic binder, wherein the amount of the inorganic fiber is 90% by mass or more. In this embodiment, a relatively small amount of an organic binder is blended to reinforce the bonding at the intersection of the inorganic fibers. Accordingly, it is presumed that the resistance to deformation of the porous (sponge) structure constituted by the inorganic fibers is improved without impairing the lightweight and the nonflammability. As a result, the porous body of this embodiment is excellent in strength and can suppress breakage of the porous body at the time of construction, so that the function provided by the porous body, such as heat-insulating property, can be suitably exhibited.

Further, the porous body can exhibit an effect excellent in the property of restoring the shape from the deformed state or compressed state (i.e., the strain of the porous body is small). Furthermore, the porous body can exhibit an excellent effect in the property of preventing the occurrence of cracks due to deformation.

In one embodiment, the amount of the inorganic fiber relative to the entire porous body is greater than 95% by mass, and may be 96% by mass or more, 97% by mass or more, or 98% by mass or more.

In one embodiment, the porous body has high strength with the fracture stress (average maximum stress) of 2.5 kPa or more, and more preferably 5.0 kPa or more. The upper limit is not defined, but may be, for example, 50 kPa or less, and may also be 20 kPa or less. The fracture stress is measured in accordance with JIS K6251:2010.

In one embodiment, the surface potential of the cutting surface immediately after cutting the porous body is preferably 1 KV or less, more preferably 0.8 KV or less, and still more preferably 0.7 KV or less. The low surface potential of the cutting surface means that the porous body is hard to be charged and excellent in static elimination. The lower limit of the surface potential may be, for example, 0.1 KV or more. The surface potential is measured by the method described in Example.

In one embodiment, the adhesion ratio at intersections of the organic binder is 7% or more. The adhesion ratio is preferably 10% or more, particularly preferably 15% or more. The higher the adhesion ratio, the higher the strength tends to be. The upper limit of the adhesion ratio may be, for example, 80%, 60%, or 55%. The adhesion ratio is measured by the method described in Example.

In one embodiment, the apparent elastic modulus (Young's modulus) is 1.0 kPa or more. The apparent elastic modulus (Young's modulus) is preferably 1.2 kPa or more, particularly preferably 1.4 kPa or more. The upper limit of the apparent elastic modulus may be, for example, 10 kPa or 5 kPa.

In one embodiment, the compressive stress when the porous body is compressed at a compression ratio of 80% at room temperature is 20 kPa or less. The compressive stress is preferably 15 kPa or less, and particularly preferably 14 kPa or less. The lower limit of the compressive stress may be, for example, 1 kPa or 5 kPa.

In one embodiment, the porous body has a recovery ratio of 70% or more, 80% or more, or 90% or more, when compressed at room temperature at a compression ratio of 80%.

Hereinafter, a member constituting the porous body of this embodiment and a producing method will be described.

(Inorganic Fiber)

The inorganic fiber contained in the porous body is not particularly limited, and for example, one or more selected from ceramic fibers, bio-soluble fibers (alkaline earth silicate fibers, rock wool, and the like), and glass fibers can be used. In one embodiment, the porous body does not contain asbestos fibers.

For example, the bio-soluble inorganic fibers are inorganic fibers having a dissolution ratio in a physiological saline solution at 40° C. of 1% or more.

The dissolution ratio in a physiological saline solution is measured as follows, for example. Specifically, first, 1 g of the sample obtained by pulverizing and preparing inorganic fibers to 200 meshes or less and 150 mL of physiological saline are put into a conical flask (volume: 300 mL), and this flask is placed in an incubator of 40° C. Horizontal vibrations (120 rpm) are continuously applied to the conical flask for 50 hours. The concentrations (mg/L) of elements, which may be main elements, e.g., silicon (Si), magnesium (Mg), calcium (Ca), sodium (Na), potassium (K), and aluminum (Al), contained in a filtrate obtained by filtration are each measured using an ICP optical emission spectrometer. The dissolution ratio (%) in a physiological saline solution is calculated based on the concentrations of the elements thus measured and the amounts (% by mass) of the elements in the inorganic fibers before being dissolved. For example, when the measured elements are silicon (Si), magnesium (Mg), calcium (Ca), and aluminum (Al), the dissolution ratio C (%) in a physiological saline solution is calculated by the following formula; C (%)=[amount of filtrate (L)×(a1+a2+a3+a4)×100]/[mass of inorganic fibers before being dissolved (mg)×(b1+b2+b3+b4)/100]." In this formula, a1, a2, a3, and a4 are respectively the measured concentration (mg/L) of silicon, magnesium, calcium, and aluminum; and b1, b2, b3, and b4 are respectively the amount (% by mass) of silicon, magnesium, calcium, and aluminum in the inorganic fibers before being dissolved.

The bio-soluble fibers have the following composition, for example.

The total of $SO_2$, $ZrO_2$, $Al_2O_3$, and $TiO_2$: 50% by mass to 82% by mass The total of alkali metal oxide and alkaline earth metal oxide: 18% by mass to 50% by mass The bio-soluble fibers may have the following composition, for example.

$SiO_2$: 50 to 82% by mass

The total of CaO and MgO: 10 to 43% by mass

The average fiber diameter of the inorganic fibers is not particularly limited, but a smaller diameter is preferable. When the fiber diameter is small, the number of fibers adhering per bubble surface area is large in the foaming step described later, and the stability of bubbles is improved. As a result, the foaming property becomes good, and a porous body having a low bulk density is easily obtained. In addition, the porous body having excellent mechanical properties such as tensile strength and compression restorability characteristics is easily obtained.

In one embodiment, the average fiber diameter of the inorganic fibers may be, for example, 0.08 μm to 4.0 μm, 0.1 μm to 2.0 μm, or 0.2 μm to 1.0 μm.

In this application, the average fiber diameter means an average of fiber diameters measured for 100 or more randomly selected fibers. The measuring method is described in Example.

When the porous body contains a cationic surfactant, in one embodiment, the zeta potential of the surface of an inorganic fiber (e.g., glass fiber) in an aqueous solution is −2 mV to −100 mV. As a result, although the bulk density is lower, a porous body having strength is easily obtained. The zeta potential is preferably −5 mV to −80 mV, particularly preferably −7 mV to −60 mV.

The zeta potential of the surface of the inorganic fibers in an aqueous solution is measured using a general-purpose zeta potentiometer for fibers (e.g., ModelFPA, manufactured by AFG Analytic Gmbh) in a state in which the fibers are dispersed in water whose pH is adjusted to 10 by ammonia, and the water temperature is set at about 20° C. (room temperature) and the fiber concentration is set to 0.5% by mass.

(Organic Binder)

When the porous body contains an elastomer as the organic binder, the strength, the property of restoring the shape from a deformed state or compressed state, and the property of preventing cracks from occurring due to deformation are further improved.

In one embodiment, the elastomer contains an elastomeric polymer. For example, the porous body contains one or more selected from the group consisting of natural elastomers, urethane elastomers, styrene-butadiene elastomers, acrylonitrile elastomers, chloroprene elastomers, butyl elastomers, chlorosulfonated polyethylene elastomers, epichlorohydrin elastomers, ethylene-propylene elastomers, acrylic elastomers, and silicone elastomers.

From the viewpoint of heat resistance, a porous body preferably contains one or more selected from the group consisting of an acrylic nitrile elastomer (heat-resistant temperature: 110° C.), a chloroprene elastomer (heat-resistant temperature: 110° C.), a butyl elastomer (heat-resistant temperature: 120° C.), a chlorosulfonated polyethylene elastomer (heat-resistant temperature: 120° C.), an epichlorohydrin elastomer (heat-resistant temperature: 120° C.), an ethylene-propylene elastomer (heat-resistant temperature: 130° C.), an acrylic elastomer (heat-resistant temperature: 140° C.), a silicone elastomer (heat-resistant temperature: 220° C.), and a fluorine elastomer (heat-resistant temperature: 250° C.). Of these, silicone elastomers and/or acrylic elastomers are preferred, and silicone elastomers are further preferred. The heat-resistant temperature is the heat-resistant temperature described in the 4th edition of the Rubber Industry Handbook.

In one embodiment, the porous body does not contain fluorine elastomers. The fluorine elastomer decomposes at high temperature, and harmful gases such as hydrogen fluoride may be generated.

In one embodiment, the amount of the organic binder in the porous body is 0.5% by mass or more and 10% by mass or less.

The amount of the organic binder in the porous body may be, for example, 1% by mass or more, 1.5% by mass or more, 2% by mass or more, 2.5% by mass or more, 3% by mass or more, 3.5% by mass or more, 4% by mass or more, or 4.5% by mass or more. In one embodiment, the amount of the organic binder in the porous body may be, for example, 9.5% by mass or less, 9% by mass or less, 8.5% by mass or less, 8% by mass or less, 7.5% by mass or less, 7% by mass or less, 6.5% by mass or less, 6% by mass or less, 5.5% by mass or less, or 5.0% by mass or less.

In one embodiment, in order to contain an organic binder in a porous body, a treatment for causing an organic binder to disappear is not performed on a composition containing an inorganic fiber and an organic binder (a porous material raw material) at the time of producing a porous body. Examples of the treatment for causing an organic binder to disappear include, for example, heat treatment under a high temperature such as 200° C. or higher, 250° C. or higher, 350° C. or higher, 400° C. or higher, or 450° C. or higher. By avoiding such heat treatment, the organic binder can be suitably contained in the porous body.

(Surfactant)

In one embodiment, the porous body contains a surfactant.

The surfactant is not particularly limited, and examples thereof include cationic surfactants and anionic surfactants. Further, nonionic surfactants or amphoteric surfactants may be included if necessary.

In one embodiment, the surfactant is a cationic surfactant. For example, when glass fibers are used as the inorganic fiber, the pH of the isoelectric point of the glass fiber is 3 or less, and the zeta potential is negative over a wide range, so the cationic surfactant is electrostatically adsorbed to the fiber surface, and a porous body having a lower bulk density is easily obtained.

Examples of the cationic surfactant include a quaternary ammonium salt type and an amine salt type. Examples of the quaternary ammonium salt type include alkyltrimethylammonium chloride, alkyltrimethylbromide, and the like. Specific examples thereof include octyltrimethylammonium chloride, decyltrimethylammonium chloride, dodecyltrimethylammonium chloride, tetradecyltrimethylammonium chloride, cetyltrimethylammonium chloride, stearyltrimethylammonium chloride, and the like.

When the porous body contains a surfactant, the amount of the surfactant in the porous body is not particularly limited, and may be, for example, 2% by mass or less, 0.001% by mass to 1.5% by mass, 0.01% by mass to 1% by mass, or 0.1% by mass to 0.5% by mass.

At the time of producing the porous body, the surfactant added to the composition (porous body raw material) is retained in the porous body by avoiding the treatment of disappearing the organic binder described above, specifically, heat treatment under high temperature.

(Coupling Agent)

In one embodiment, the porous body may contain a coupling agent or may not contain a coupling agent. Examples of the coupling agent include silane coupling agents and titanium coupling agents. Examples of the silane coupling agent include methyltriethoxysilane and the like.

When the porous body contains a coupling agent, the amount of the coupling agent is not particularly limited, and may be, for example, 5% by mass or less, 4% by mass or less, 3% by mass or less, 2% by mass or less, 1% by mass or less, 0.5% by mass or less, 0.3% by mass or less, 0.1% by mass or less, or 0.05% by mass or less.

In one embodiment, the smaller the amount of the coupling agent, or the absence of the coupling agent, the porous body further improves in the strength, the property of restoring the shape from a deformed state or compressed state, and the property of preventing cracks from occurring due to deformation.

In one embodiment, bubbles are formed in the porous body in a manner described later. Therefore, the porous body may be constituted without fluoromica or gum arabic that promotes bubble formation. In addition, as a different embodiment, the porous body may be constituted with fluoromica or gum arabic.

In one embodiment, the bulk density (normal temperature, compression ratio of 0%) of the porous body is not particularly limited, for example, 1 to 130 kg/m$^3$, 2 to 120 kg/m$^3$, 3 to 100 kg/m$^3$, 4 to 90 kg/m$^3$, 5 to 80 kg/m$^3$, or 5 to 50 kg/m$^3$. In one embodiment, it is possible to obtain a porous body having a particularly low density, such as 30 kg/m$^3$ or less, 25 kg/m$^3$ or less, 23 kg/m$^3$ or less, or 20 kg/m$^3$ or less.

(Producing Method)

The porous body according to one embodiment is obtained by a producing method containing, for example, a preparing step of preparing an inorganic fiber dispersion liquid, a foaming step of foaming the inorganic fiber dispersion liquid, and a dehydration step of drying the foam body (porous body) (a step of removing a dispersion medium) (first producing method).

An aspect of the preparing step contains a charging step of negatively or positively charging a surface of an inorganic fiber in water, a surfactant adding step, and an organic binder adding step.

In the charging step, by adjusting pH using an alkaline or acidic treatment liquid, the zeta potential of the surface of the inorganic fiber can be controlled. Specifically, the zeta potential of the surface of the inorganic fiber is allowed to be negative or positive. The treatment liquid may be any liquid capable of dissolving in water to change pH, and for example, an acid or a base of an inorganic compound, and acid or a base of an organic compound can be used.

In the surfactant adding step, a surfactant may be added to water containing an inorganic fiber. When the surface of the inorganic fiber is negatively charged in the previous charging step, it is preferable to add a cationic surfactant, or when the surface of the inorganic fiber is positively charged in the previous charging step, it is preferable to add an anionic surfactant. In other words, in the surfactant adding step, preferably, a surfactant having a hydrophilic group having an opposite sign is added to the charged inorganic fiber to adsorb the hydrophilic group side of the surfactant on the surface of the inorganic fiber so that the hydrophobic group side is disposed on the opposite side of the surface of the inorganic fiber, whereby the inorganic fiber (outermost surface) can be hydrophobized. When foaming is conducted by introducing air in the foaming step mentioned later in a state that the surface of the inorganic fiber is hydrophobic by absorbing the surfactant as mentioned above, formation of bubbles is promoted on the hydrophobic group side in the surface of the inorganic fiber, whereby a well-foamed porous body can be obtained. In other words, by controlling the zeta potential of the surface of the inorganic fiber, a surfactant is allowed to interact with the inorganic fiber to hydrophobize the fiber, and thus bubbles easily moor (adhere) to around the inorganic fiber for forming a foamed porous body (spongy structure). In one embodiment, the zeta potential of the surface of the inorganic fiber exhibits non-zero values, e.g., −2 mV to −100 mV, −5 to −80 mV, −7 mV to −60 mV, −10 mV to −45 mV, +2 mV to +100 mV, +5 to +80 mV, 7 mV to +60 mV, or +10 mV to +45 mV. Depending on the type of fiber, the pH to achieve a predetermined zeta potential will vary, and hence, preferable pH cannot be specified to one value; and as for pH, for example, negative charging is possible at a pH of 7.5 to 13, and positive charging is possible at a pH of 2 to 6. The zeta potential can be obtained by dispersing the fiber in an aqueous dispersion medium adjusted to have a predetermined pH and measuring by using a general-purpose zeta potential meter (e.g., ModelFPA, manufactured by AFG Analytic Gmbh).

In the organic binder adding step, an organic binder may be added to water containing an inorganic fiber. The organic binder may be added, for example, in the form of a resin emulsion or the like. Such a resin emulsion may contain a polymer and a crosslinking agent for crosslinking the polymer. In one embodiment, the crosslinking agent acts to crosslink the polymer, e.g., in a subsequent dehydration step.

In the preparing step described above, the surfactant adding step can be performed simultaneously with the charging step or after the charging step. When the charging step and the surfactant adding step are simultaneously performed, the treatment liquid, the inorganic fiber, and the surfactant can be mixed together. When a surfactant adding step is performed after the charging step, the inorganic fiber can be opened and dispersed in advance with a treatment liquid to be charged, and then mixed with a surfactant.

Also, the organic binder adding step can be performed simultaneously with the charging step or after the charging step. Further, the organic binder adding step may be performed before or after the surfactant adding step, or simultaneously with the surfactant adding step.

As another embodiment of the above-described preparing step, it is also possible to prepare by putting an inorganic fiber in which at least a surface is hydrophobized by surface treatment with an amphiphilic substance, a silane coupling agent having a hydrophobic functional group, a titanium coupling agent having a hydrophobic functional group, or the like, without using a surfactant, into a dispersion liquid (dispersion medium). The coupling agent in this step is used for bringing the inorganic fiber into a hydrophobic state to form a porous body. The coupling agent used in the coupling agent imparting step described later is for preventing the form of the porous body from collapsing due to wetting with water.

The amount of the surfactant in the dispersion liquid can be appropriately set according to the inorganic fiber, and for example, the surfactant may be set to 0.01 to 1 part by mass based on 100 parts by mass of the glass fiber. The surfactant may preferably be 0.1 to 0.8 parts by mass, more preferably be 0.2 to 0.7 parts by mass.

In the foaming step, air (bubble) is supplied from a bubble supplying device to a dispersion in which the inorganic fiber is dispersed, thereby causing the dispersion liquid to foam. It is to be noted that air (bubble) may be supplied to the inorganic fiber dispersion liquid by stirring, thereby causing the dispersion liquid to foam without using a bubble supplying device. The magnification of bubbles, the amount of bubbles, and the diameter of bubbles can be adjusted by such a bubble supplying device or stirring. As a result, the density of the obtained porous body can be controlled.

In the dehydration step, the foamed body (porous body) is dehydrated by drying (including natural drying) the dispersion medium contained in the dispersion liquid under a predetermined temperature of normal or non-normal temperature for a predetermined time. From a viewpoint of favorably retaining the organic binder, drying temperatures may be, for example, 200° C. or less, 150° C. or less, 100° C. or less, or 90° C. or less.

In one embodiment, the method of producing a porous body may further contain a coupling agent imparting step of imparting a coupling agent to the porous body after drying described above. In the coupling agent imparting step, the porous body, the coupling agent, and water vapor are reacted to allow the porous body to be imparted with the coupling agent. Specifically, vapor generated by heating the coupling agent is adhered to the porous body, and allow the porous body to react with water vapor. By treating with water vapor, the coupling agent is hydrolyzed, fused by dehydration, and adheres to the porous body. For example, the porous body and the vapor of the coupling agent are brought into contact with each other in a closed container (an airtight container into which no gas is mixed from the outside but the inside pressure can be increased by heating the inside). After contacting, water is put in the closed container to allow water vapor to be generated, and the water vapor is allowed to be reacted with the coupling agent. When a large amount of the coupling agent is imparted, in place of or in addition to the above-mentioned treatment, the porous body can be directly impregnated with the coupling agent and heated. Thereafter, the porous body is in contact with water vapor. In addition, when a large amount of the coupling agent is further imparted, in addition to the above treatment, the porous body can be directly impregnated with a hydrolytic solution prepared by mixing the coupling agent and water in advance, and then heated.

From the viewpoint of remarkably exhibiting an effect by an organic binder, it is also preferable to omit the coupling agent imparting step.

In addition to the first producing method, the porous body is obtained by a producing method containing, for example, a preparing step (excluding an organic binder addition step) of preparing an inorganic fiber dispersion liquid, a foaming step of foaming the inorganic fiber dispersion liquid, a dehydrating step of drying the foamed body (porous body) (a removing step of a dispersion medium), a step of firing the foamed body (porous body) after drying, and a step of adding an organic binder to the firing product (a second producing method).

The steps prior to the firing step of the second producing method are the same as until the dehydration step of the first producing method, except that the organic binder addition step is not performed.

In the firing step, the foamed body after drying is fired at a high temperature (e.g., 450° C.) to remove the surfactant. It is to be noted that the firing step can be performed simultaneously with the dehydration step.

In the organic binder addition step, an organic binder is added to a firing product obtained by firing, using a method such as coating, spraying, and the like.

In the drying step of the organic binder, water and organic solvents, which are dispersion medium contained in the applied material containing the organic binder, are dried and removed by heating or other means as necessary. When a crosslinkable organic binder is used, the organic binder can be crosslinked, for example, by a drying step described above or a crosslinking step such as a heat treatment which can be separately provided.

The porous body of one embodiment may essentially consist of or may consist of an inorganic fiber, a surfactant, and an organic binder, may essentially consist of or may consist of or an inorganic fiber and an organic binder. Herein, "essentially consist of" means that 95% by mass or more, 98% by mass or more, or 99% by mass or more are composed of these components.

(Use)

The use of the porous body is not particularly limited, and for example, the porous body can be suitably used as a sound-insulating material, a heat-insulating material, a sound-absorbing material, or a sealing material. The sound-insulating material, the heat-insulating material, the sound-absorbing material, or the sealing material contains the porous body described above. As a result, the sound-insulating material, the heat-insulating material, the sound-absorbing material, or the sealing material is excellent in strength, can prevent breakage of the porous body at the time of construction, and can suitably exhibit the function provided by the porous body.

As the sound-insulating material, for example, in the transportation equipment field, a sound-insulating material for railway vehicles, a sound-insulating material for automobiles, a sound-insulating material for aircraft, a sound-insulating material for ships, a sound-insulating material for walls; and in the architectural field, a sound-insulating material for ceilings and walls of houses, and the like, a sound-insulating material for ducts, a sound-insulating material for a sound-insulating walls of highways and railway vehicles, a sound-insulating material for gas water heaters, and the like are mentioned.

As the heat-insulating material, for example, in the transportation equipment field, a heat-insulating material for railway vehicles, a heat-insulating material for automobiles, a heat-insulating material for aircraft, a heat-insulating material for ships; in the architectural field, a heat-insulating material for walls and ceilings of houses and for joint materials of houses; in the general industrial field, a heat-insulating material for industrial furnaces, a heat-insulating material for piping, a heat-insulating material for ducts, and the like are mentioned.

As the sealing material, for example, a sealing material for gas water heaters, and a sealing material for various industrial exhaust gas, and a sealing material for fire and smoke prevention in elevators, and the like are mentioned.

EXAMPLES

Hereinbelow, specific examples will be given. The invention is not limited to these examples.

Examples 1 to 10

Microglass fibers (manufactured by Unifrax, C-04-F, average fiber diameter 0.25 μm (catalog value: 0.53 μm)) were dispersed in ammonia water of pH10 so as to have a concentration of 0.5% by mass, and the zeta potential of the fiber surface was adjusted to −55 mV and treated.

Next, a silicone emulsion (trade name; POLON-MF-56, manufactured by Shin-Etsu Chemical Co., Ltd.) or an acrylic emulsion (trade name; Nipol LX874, manufactured by Zeon Corporation) as an organic binder and a cationic surfactant (cetyltrimethylammonium chloride (trade name: QUARTAMIN 60 W, manufactured by Kao Corporation)) were added to the above sample. The organic binder was added in the blending amount shown in Table 1. The surfactant was added at a ratio of 0.77 to 0.91 parts by mass per 100 parts by mass of the fiber. Note that the blending amount of the organic binder shown in Table 1 is a solid equivalent value.

Next, the sample was stirred and mixed. At this time, air was taken in, and the sample was foamed.

The obtained wet porous body (foamed body) was dried in an oven at 80° C. for 8 hours to obtain a porous body. Note that, with drying, the component derived from the silicone emulsion (solid content) was crosslinked to form a silicone elastomer, and the component derived from the acrylic emulsion (solid content) was crosslinked to form an acrylic elastomer.

Note that the average fiber diameter of the inorganic fiber was determined by the following method.

A scanning electron microscope (manufactured by JEOL Ltd., JSM-7600) was used to take an image at a magnification in which the number of fibers per field of view was about 5 to 30. The magnification is appropriately set to, for example, 5000 times when the average fiber diameter is about 0.2 μm, 3000 times when the average fiber diameter is about 1.0 μm, and 1000 times when the average fiber diameter is 2.0 μm.

The obtained image was analyzed by an image analysis software ImageJ to measure the distance between the ends of the fibers, using the scale bar in the image as the reference length.

The fiber diameter was measured for 100 or more fibers, and the arithmetic average value of the obtained measurement values was defined as the average fiber diameter.

Example 11

A porous material was produced in the same manner as in Example 4 except that glass fiber (manufactured by Unifrax, C-18-R, average fiber diameter 0.89 μm (catalogue value: 1.8 μm), hereinafter referred to as glass fibers A) was used.

The porous body obtained in Examples and Comparative Examples described later was evaluated as follows.

(1) Bulk Density

The mass of the porous body was calculated by dividing the apparent volume of the porous body (e.g., the product of vertical, horizontal, and height dimensions) measured using a sizing device (e.g., a caliper).

(2) Fracture Stress and Amount of Strain

A dumbbell-shaped sample was cut from the porous body, and the fracture stress and the fracture strain were measured in accordance with JIS K6251:2010. At least three measurements were conducted, the average value, maximum value, minimum value, and standard deviation were obtained for the fracture stress and the fracture strain, respectively, and the value of the average maximum stress was defined as the fracture stress, the value of the average maximum strain was defined as the fracture strain.

(3) Winding Test

A sample having a thickness of 10 mm was cut from the porous body. The sample was placed on a cylindrical surface having a tube diameter (outer diameter) of 200 mm, and the sample was deformed along the cylindrical surface. The appearance of the sample after deformation was visually observed and evaluated according to the following evaluation criteria.

[Evaluation Criteria]

◯: No change is observed in appearance such as cracks (FIG. 1(A), for example).

Δ: A slight crack is generated on the surface, but there is no problem in practical use.

×: A significant crack is generated on the surface (FIG. 1(B), for example).

(4) Apparent Elastic Modulus

The apparent elastic modulus was calculated based on the ratio between the fracture stress measured in the above (2) (maximum stress) and the fracture strain when showing the fracture stress.

(5) Compression Characteristic (a) Recovery Ratio

The dimension of the sample was measured in the same manner as in the case of the bulk density as mentioned above. The thickness of the sample was set as 100% and the compression ratio was set (80%), and the sample was compressed (2 mm/min) to the predetermined thickness using a material testing machine (Autograph, manufactured by Shimadzu Corporation). The thickness of the sample after the completion of the test was measured, and the recovery ratio was calculated from the following formula:

Recovery ratio (%)=Thickness after compression test÷Thickness before compression test×100.

(b) Compressive Stress

As shown by the following formula, the compressive stress was calculated by dividing a load value when the sample was compressed in the test by the area (vertical dimension and horizontal dimension) obtained by the sample dimension measurement. The load when the sample was compressed was determined by measuring the dimensions of the sample in the same way as the bulk density described above, setting the compression ratio (80%) with the thickness of this sample as 100%, and using a material testing machine (Autograph, manufactured by Shimadzu Corporation) to determine the weighted value when compressed (2 mm/min) to the predetermined thickness.

Compressive stress Pa (N/m$^2$)=Measured load (N)/Sample area (m$^2$)

(6) Evaluation of Bonding Status

Figure 2:
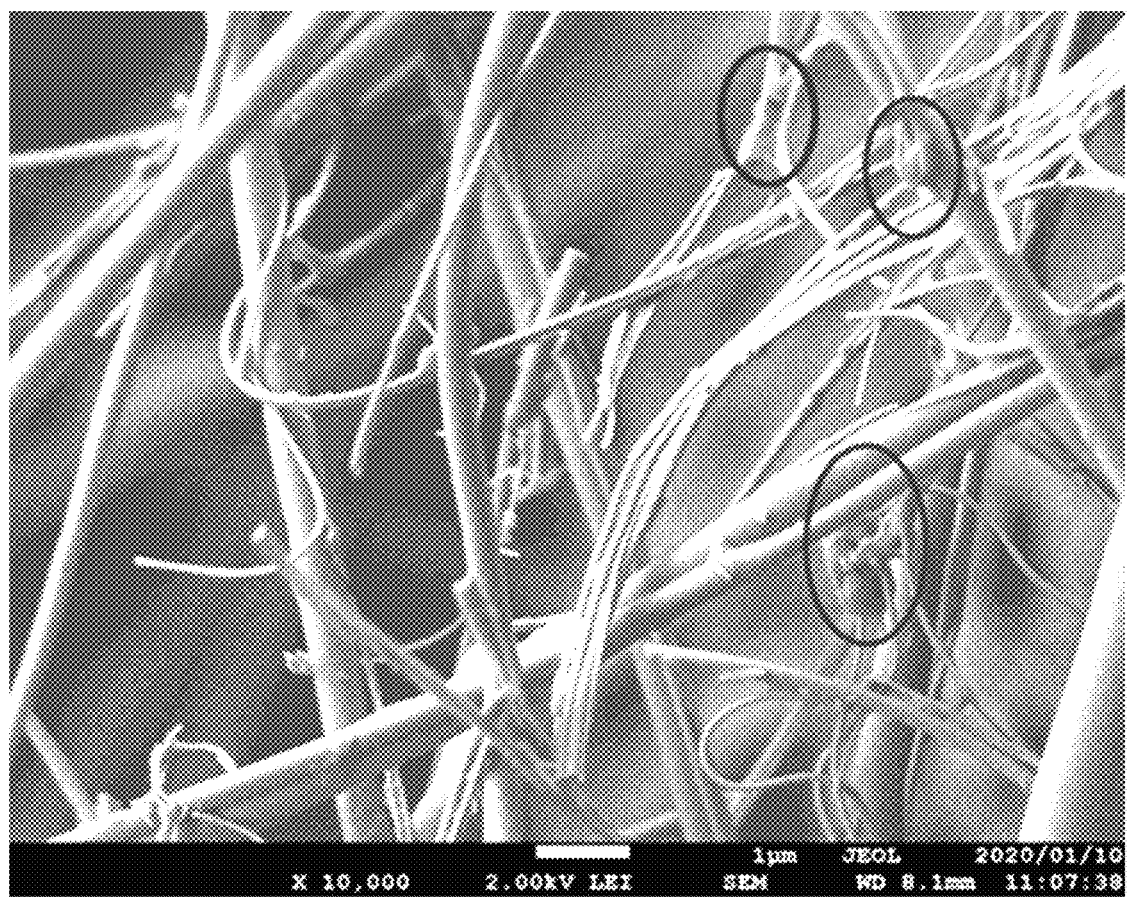
FIG. 2 is a scanning electron micrograph of the inside of the porous body of Example 1.

Scanning electron microscopy (SEM) was used to evaluate the state in which the binder contributed to the bonding between fibers inside the porous body. Specifically, four samples of 1 mm square were collected from the inside of the porous body, and for each sample, two to three SEM observations were performed in an arbitrary range of 9.0 μm×12.0 μm, and a total of ten observations were performed. In ten observations (field of view), the ratio of the intersection B to which the binder was adhered based on the total number A of positions where the fibers intersected (intersection) (B×100/A) was defined as the adhesion ratio. As an example, a scanning electron micrograph of the inside of the porous body of Example 1 is shown in FIG. 2. The intersection to which the binder is attached is indicated by "◯."

(7) Static Elimination

The static elimination was evaluated by evaluating the surface potential before and after cutting of the porous body. Specifically, a sample of 100 mm square having a thickness of 10 mm was cut in the plane direction at a speed of about 10 mm/min using a food slicer (solida4, manufactured by RITTER) so that the thicknesses was 1 mm and 9 mm. Surface potentials of the two cut surfaces before cutting and immediately after cutting were measured by an electrostatic potential measuring instrument (manufactured by SHISHIDO ELECTROSTATIC, LTD., STATIRON DZ4 tuning fork type). The measurement distance was 30 mm. Of the surface potentials of the two cut surfaces, the value having the larger absolute value was used as the surface potential after cutting.

The above results are shown in Tables 1 and 2.

TABLE 1

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Average fiber diameter | | μm | 0.25 | 0.25 | 0.25 | 0.25 | 0.25 | 0.25 | 0.25 | 0.25 | 0.25 | 0.25 | 0.89 |
| Inorganic fiber | | parts by mass (% by mass) | 100 (98.1) | 100 (97.2) | 100 (96.2) | 100 (94.4) | 100 (92.7) | 100 (90.2) | 100 (98.5) | 100 (97.3) | 100 (95.5) | 100 (92.0) | 100 (94.4) |
| Organic binder | Silicone | parts by mass (% by mass) | 1.0 (1.0) | 2.0 (1.9) | 3.0 (2.9) | 5.0 (4.7) | 7.0 (6.5) | 10.0 (9.0) | — | — | — | — | 5.0 (4.7) |
| | Acrylic | parts by mass (% by mass) | — | — | — | — | — | — | 0.79 (0.78) | 2.0 (2.0) | 3.9 (3.8) | 7.9 (7.2) | — |
| | Silane coupling agent | parts by mass (% by mass) | — | — | — | — | — | — | — | — | — | — | — |
| Type of surfactant *1 | | | + | + | + | + | + | + | + | + | + | + | + |
| Bulk density | | kg/m$^3$ | 20.5 | 20.8 | 21.6 | 21.9 | 19.3 | 18.4 | 21.0 | 22.1 | 21.3 | 22.8 | 27.5 |
| Fracture stress | average maximum stress | kPa | 7.2 | 5.0 | 10.2 | 9.5 | 13.0 | 15.3 | 5.1 | — | 5.5 | 7.2 | 7.6 |
| | maximum value | kPa | 8.3 | 7.5 | 11.7 | 13.1 | 13.2 | 18.3 | 5.6 | — | 7.6 | 9.7 | 9.1 |
| | minimum value | kPa | 6.4 | 1.3 | 9.0 | 5.8 | 12.8 | 12.5 | 4.5 | — | 3.8 | 5.1 | 6.4 |
| | standard deviation | kPa | 0.9 | 1.8 | 1.4 | 2.2 | 0.2 | 2.9 | 0.3 | — | 1.2 | 1.7 | 0.9 |

TABLE 1-continued

| | | | Example |||||||||||
|---|---|---|---|---|---|---|---|---|---|---|---|---|
| | | | 1 | 2 | 3 | 4 | 5 | 6 | 7 | 8 | 9 | 10 | 11 |
| Average fiber diameter | | μm | 0.25 | 0.25 | 0.25 | 0.25 | 0.25 | 0.25 | 0.25 | 0.25 | 0.25 | 0.25 | 0.89 |
| Fracture strain | average maximum strain | % | 4.1 | 3.7 | 4.2 | 4.4 | 5.1 | 5.2 | 3.8 | — | 4.1 | 4.8 | 3.6 |
| | maximum value | % | 4.6 | 5.3 | 4.4 | 5.9 | 5.4 | 5.3 | 4.8 | — | 4.8 | 5.5 | 3.8 |
| | minimum value | % | 3.7 | 1.1 | 4.0 | 2.8 | 4.9 | 5.2 | 3.1 | — | 3.4 | 4.1 | 3.3 |
| | standard deviation | % | 0.5 | 1.0 | 0.2 | 1.2 | 0.3 | 0.0 | 0.6 | — | 0.5 | 0.5 | 0.2 |
| Apparent elastic modulus | average maximum elastic modulus | kPa | 1.6 | 1.4 | 2.4 | 2.4 | 2.5 | 2.9 | 1.4 | — | 1.4 | 1.5 | 2.1 |
| | maximum value | kPa | 2.4 | 2.4 | 2.6 | 3.8 | 2.6 | 3.5 | 1.7 | — | 1.7 | 2.0 | 2.4 |
| | minimum value | kPa | 0.4 | 0.4 | 2.1 | 1.3 | 2.4 | 2.4 | 0.9 | — | 1.0 | 1.1 | 1.9 |
| | standard deviation | kPa | 0.5 | 0.5 | 0.3 | 1.0 | 0.1 | 0.5 | 0.3 | — | 0.3 | 0.3 | 0.2 |
| Compression characteristic | recovery ratio after 80% compression | % | — | — | — | 95.7 | — | — | — | — | — | — | 90.0 |
| | compressive stress at 80% compression | kPa | — | — | — | 8.3 | — | — | — | — | — | — | 13.4 |
| | Winding test | | Δ | ○ | — | ○ | — | ○ | — | ○ | ○ | ○ | — |
| Bonding status | the number of fields of view observed | | 10 | 10 | 10 | 10 | 10 | 10 | 10 | 10 | 10 | 10 | — |
| | the number of fields of view where adhesion was | | 6 | 5 | 7 | 10 | 10 | 10 | 6 | 6 | 6 | 10 | — |
| | adhesion ratio | % | 17.5 | 15.5 | 40.2 | 37.0 | 48.1 | 52.7 | 11.4 | 16.3 | 19.7 | 40.5 | — |
| Static elimination (surface potential) | before cutting | KV | 0.13 | 0.11 | 0.16 | 0.19 | 0.24 | 0.38 | 0.12 | 0.28 | 0.08 | 0.26 | — |
| | after cutting | KV | 0.15 | 0.29 | 0.69 | 0.69 | 0.56 | 0.58 | 0.37 | 0.26 | 0.29 | 0.39 | — |

TABLE 2

| | | | Comp. Ex. |||||||
|---|---|---|---|---|---|---|---|---|---|
| | | | 1 | 2 | 3 | 4 | 5 | 6 | 7 |
| Average fiber diameter | | μm | 0.25 | 0.25 | 0.89 | 0.25 | 0.89 | 2.1 | 2.1 |
| Inorganic fiber | | parts by mass (% by mass) | 100 (99.0) | 100 (95.2) | 100 (95.2) | 100 (95.2) | 100 (94.4) | 100 (94.4) | 100 (94.4) |
| Organic binder | Silicone | parts by mass (% by mass) | — | — | — | 5.0 (4.7) | 5.0 (4.7) | 5.0 (4.7) | 5.0 (4.7) |
| | Acrylic | parts by mass (% by mass) | — | — | — | — | — | — | — |
| Silane coupling agent | | parts by mass (% by mass) | 1.0 (1.0) | 5.0 (4.8) | 5.0 (4.8) | — | — | — | — |
| Type of surfactant *1 | | | + | + | + | − | − | − | + |
| Bulk density | | kg/m³ | 21.0 | 21.6 | 25.5 | 76.0 | 34.8 | 20.2 | 28.2 |
| Fracture stress | average maximum stress | kPa | 2.2 | 1.6 | 4.5 | — | 2.5 | 1.0 | 1.5 |
| | maximum value | kPa | 2.9 | 2.1 | 9.3 | — | 3.1 | 1.0 | 1.9 |
| | minimum value | kPa | 1.4 | 1.1 | 1.9 | — | 2.1 | 0.8 | 0.9 |
| | standard deviation | kPa | 0.5 | 0.3 | 3.2 | — | 0.5 | 0.1 | 0.4 |
| Fracture strain | average maximum strain | % | 4.4 | 2.6 | 1.1 | — | 2.7 | 3.3 | 3.1 |
| | maximum value | % | 5.5 | 3.7 | 1.3 | — | 3.1 | 3.4 | 3.5 |
| | minimum value | % | 3.0 | 0.3 | 0.8 | — | 2.3 | 3.2 | 2.8 |
| | standard deviation | % | 0.8 | 1.2 | 0.2 | — | 0.4 | 0.1 | 0.3 |
| Apparent elastic modulus | average maximum elastic modulus | kPa | 0.5 | 0.6 | 4.4 | — | 0.9 | 0.3 | 0.5 |
| | maximum value | kPa | 0.7 | 0.7 | 8.2 | — | 1.0 | 0.3 | 0.6 |
| | minimum value | kPa | 0.3 | 0.4 | 1.6 | — | 0.8 | 0.2 | 0.3 |
| | standard deviation | kPa | 0.1 | 0.1 | 3.1 | — | 0.1 | 0.0 | 0.1 |

TABLE 2-continued

| | | | Comp. Ex. | | | | | | |
|---|---|---|---|---|---|---|---|---|---|
| | | | 1 | 2 | 3 | 4 | 5 | 6 | 7 |
| Average fiber diameter | | μm | 0.25 | 0.25 | 0.89 | 0.25 | 0.89 | 2.1 | 2.1 |
| Compression characteristic | recovery ratio after 80% compression | % | — | 84.2 | 74.1 | — | 78.3 | 69.6 | 86.2 |
| | compressive stress at 80% compression | kPa | — | 11.0 | 15.0 | — | 24.7 | 5.9 | 7.2 |
| | Winding test | | — | × | — | — | — | — | — |
| Bonding status | the number of fields of view observed | | 10 | 10 | — | — | — | - | — |
| | the number of fields of view where adhesion was | | 1 | 4 | — | — | — | - | — |
| | adhesion ratio | % | 0.9 | 6.5 | — | — | — | - | — |
| Static elimination (surface potential) | before cutting | KV | 0.05 | 0.03 | — | — | — | — | — |
| | after cutting | KV | 1.98 | 1.42 | — | — | — | — | — |

In the table, the residue of "% by mass" is a surfactant
*1: "+" means that a cationic surfactant was used, and "−" means that an anionic surfactant was used.

Comparative Examples 1, 2

The same microglass fibers as in Example 1 (average fiber diameter 0.25 μm) were dispersed in ammonia water of pH10 so as to have a concentration of 0.5% by mass, and the zeta potential on the surface of the fiber was adjusted to −55 mV and treated.

Next, a cationic surfactant (cetyltrimethylammonium chloride (trade name: QUARTAMIN 60 W, manufactured by Kao Corporation)) was added to the above sample. The surfactant was added at a proportion of 0.91 parts by mass per 100 parts by mass of the fiber.

Next, the sample was stirred and mixed. At this time, air was taken in, and the sample was foamed.

The resulting wet porous body was dried and treated for 1 hour at 450° C. using an electric furnace to remove the surfactant adhering to the porous body. Next, a coupling agent was imparted. As the coupling agent, methyltriethoxysilane (trade name: KBE-13, manufactured by Shin-Etsu Chemical Industry Co., Ltd.) was used. Methyltriethoxysilane and water were mixed and stirred for 2 hours to complete the hydrolysis reaction. This hydrolysis solution was directly applied so that the mass of the solid matter in this hydrolysis solution was 1 part by mass or 5 parts by mass per 100 parts by mass of the foamed body. The wet porous body after applying was subjected to drying treatment at 105° C. for 12 hours to obtain a porous body.

The amount of the coupling agent in the obtained porous body was calculated from the weight change of the porous body before and after treatment with the coupling agent.

Comparative Example 3

A porous body was produced in the same manner as in Comparative Example 2, except that glass fiber A (average fiber diameter 0.89 μm) was used.

Comparative Example 4

The production of the porous body was attempted in the same manner as in Example 4, except that an anionic surfactant (sodium dodecylbenzenesulfonate, soft type, manufactured by Tokyo Chemical Industry Co., Ltd.) was used as a surfactant and added at a proportion of 0.91 parts by mass per 100 parts by mass of fibers. As a result, the bulk density was 76 kg/m$^3$, and an ultra-low density porous body was not obtained.

Comparative Example 5

A porous body was produced in the same manner as in Example 4, except that the same anionic surfactant as in Comparative Example 4 was used as a surfactant and glass fiber A (average fiber diameter 0.89 μm) was used. As a result, the bulk density was 34.8 kg/m$^3$, and an ultra-low density porous body was not obtained.

Comparative Example 6

A porous body was produced in the same manner as in Example 4, except that the same anionic surfactant as in Comparative Example 4 was used as a surfactant, and glass fiber (manufactured by Unifrax, C-50-R, average fiber diameter 2.1 μm (catalog value: 4.1 μm), hereinafter, referred to as glass fibers B) was used. As a result, a porous body having a low bulk density was obtained, but fracture stress and the like were lowered.

Comparative Example 7

A porous body was produced in the same manner as in Example 4, except that glass fiber B (average fiber diameter 2.1 μm) was used. As a result, a porous body having a low bulk density was obtained, but fracture stress and the like were lowered.

INDUSTRIAL APPLICABILITY

The porous body of the invention can be used, for example, as a sound-insulating material, a heat-insulating material, a sound-absorbing material, and a sealing material.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents mentioned in this specification and the content of the application serving as a basis of claiming the priority concerning the present application to the Paris Convention are all incorporated by reference.

The invention claimed is:

1. A porous body comprising an inorganic fiber and an organic binder, wherein
the average fiber diameter of the inorganic fiber is 2.0 μm or less,
the amount of the inorganic fiber is 90% by mass or more,
the amount of the organic binder is 0.5% by mass or more and less than 5.0% by mass,
the organic binder contains an elastomer, wherein the elastomer is a silicone elastomer, and
the bulk density of the porous body is 30 kg/m$^3$ or less.

2. The porous body according to claim 1, wherein the porous body further comprises a cationic surfactant.

3. The porous body according to claim 2, wherein the zeta potential of the surface the inorganic fiber in an aqueous solution is −2 mV to −100 mV.

4. A porous body comprising an inorganic fiber and an organic binder, wherein
the average fiber diameter of the inorganic fiber is 2.0 μm or less,
the amount of the inorganic fiber is 90% by mass or more,
the amount of the organic binder is 0.5% by mass or more and less than 5.0% by mass,
the organic binder contains an elastomer,
the bulk density of the porous body is 30 kg/m$^3$ or less, and
an adhesion ratio at intersections of the organic binder is 10% or more.

5. The porous body according to claim 1, wherein an average fiber diameter of the inorganic fiber is 1.0 μm or less.

6. The porous body according to claim 1, wherein the organic binder additionally contains an acrylic elastomer.

7. The porous body according to claim 1, wherein the fracture stress of the porous body is 2.5 kPa or more.

8. The porous body according to claim 1, wherein the apparent elastic modulus of the porous body is 1.0 kPa or more.

9. The porous body according to claim 1, wherein the amount of the organic binder is 2.9% by mass or less.

10. A porous body comprising an inorganic fiber and an organic binder, wherein
the average fiber diameter of the inorganic fiber is 2.0 μm or less,
the amount of the inorganic fiber is 90% by mass or more,
the amount of the organic binder is 0.5% by mass or more and less than 5.0% by mass,
the organic binder contains an elastomer,
the bulk density of the porous body is 30 kg/m$^3$ or less, and
the amount of the organic binder is 1.9% by mass or less.

* * * * *